United States Patent
Natanzon

(10) Patent No.: US 10,860,444 B2
(45) Date of Patent: Dec. 8, 2020

(54) SEAMLESS MOBILITY FOR KUBERNETES BASED STATEFUL PODS USING MOVING TARGET DEFENSE

(71) Applicant: EMC IP Holding Company LLC, Hopkinton, MA (US)

(72) Inventor: Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 149 days.

(21) Appl. No.: 16/049,493

(22) Filed: Jul. 30, 2018

(65) Prior Publication Data

US 2020/0034254 A1    Jan. 30, 2020

(51) Int. Cl.
  *G06F 11/00* (2006.01)
  *G06F 11/20* (2006.01)
  *G06F 9/455* (2018.01)
  *G06F 3/06* (2006.01)

(52) U.S. Cl.
  CPC ............ *G06F 11/203* (2013.01); *G06F 3/065* (2013.01); *G06F 3/067* (2013.01); *G06F 3/0619* (2013.01); *G06F 3/0647* (2013.01); *G06F 3/0664* (2013.01); *G06F 9/455* (2013.01); *G06F 11/2094* (2013.01); *G06F 2201/805* (2013.01); *G06F 2201/81* (2013.01); *G06F 2201/815* (2013.01); *G06F 2201/82* (2013.01)

(58) Field of Classification Search
  CPC ........ G06F 11/203; G06F 3/065; G06F 3/067; G06F 3/0664; G06F 3/0647; G06F 3/0619; G06F 11/2094; G06F 9/455; G06F 2201/81; G06F 2201/815; G06F 2201/805; G06F 2201/82
  USPC .......................................................... 714/6.3
  See application file for complete search history.

(56) References Cited

U.S. PATENT DOCUMENTS

| | | | |
|---|---|---|---|
| 10,191,778 B1 * | 1/2019 | Yang | G06F 9/45558 |
| 10,613,779 B1 * | 4/2020 | Brooks | G06F 11/2064 |
| 2018/0260125 A1 * | 9/2018 | Botes | G06F 16/275 |
| 2019/0065323 A1 * | 2/2019 | Dhamdhere | G06F 11/3452 |
| 2019/0356609 A1 * | 11/2019 | Grunwald | G06F 11/2082 |

* cited by examiner

*Primary Examiner* — Yair Leibovich
(74) *Attorney, Agent, or Firm* — Staniford Tomita LLP

(57) ABSTRACT

Providing seamless mobility of stateful pods in a container management system, by: receiving an indication that a pod needs to be moved from a first site to a replica site, identifying, through a moving target defense (MTD) process, all persistent volumes attached to the pod; determining if an RPO/RTO objective for the movement is below a threshold value, draining all local I/O operations to a container having the persistent volumes attached; killing containers of the pod using the persistent volumes after the draining, waiting for data to be flushed to the replica site, initiating a failover of a first storage of the first site, and restarting a container to run on the replica site attached to replica storage. In this process, a resource management system (RMS) is used to provide an address of a secure golden copy of the container as the address of the replica site.

20 Claims, 8 Drawing Sheets

SEAMLESS MOBILITY FOR KUBERNETES BASED STATEFUL PODS USING MOVING TARGET DEFENSE

CROSS-REFERENCE TO RELATED APPLICATIONS

The present application is related to U.S. patent application Ser. No. 16/049,564 entitled "Network Block Device Based Continuous Replication for Kubernetes Container Management Systems" and filed on Jul. 30, 2018.

TECHNICAL FIELD

Embodiments are generally directed to containerized networks, and more specifically to live migrating large numbers of containers and storage in Kubernetes systems.

BACKGROUND

Containerization technology has been developed as a lightweight alternative to full machine virtualization that involves encapsulating an application in a container with its own operating environment. This provides many of the benefits of loading an application onto a virtual machine (VM), as the application can be run on any suitable physical machine without any concern about dependencies. Containerization has gained recent prominence with the open-source Docker, in which containers are deployed as portable, self-sufficient containers that can run on everything from physical computers to VMs, bare-metal servers, cloud clusters, and so on. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

The Kubernetes system (developed by Google) is becoming a popular container management platform for managing containerized applications in a clustered environment. It aims to provide better ways of managing related, distributed components across varied infrastructures. New backup mechanisms like Heptio Ark, and similar systems, allow data backups to a Kubernetes environment.

Like many current information technology platforms, container management systems are built to operate in a relatively static configuration. For example, addresses, names, software stacks, application identifiers, and various configuration parameters remain more or less the same over long periods of time. While simple, such a static approach represents a system vulnerability and security weakness that can be exploited by malicious attack or other data corruption. To overcome such vulnerabilities with static IT systems, a Moving Target Defense (MTD) technique has been developed to provide change across multiple system dimensions in order to increase uncertainty and apparent complexity for attackers, reduce their window of opportunity and increase the costs of their probing and attack efforts. Moving target strategies dynamically and continuously shift the attack surface and force attackers to expend resources monitoring investigating an ever-shifting attack surface, such that over time the difficulty of an attack goes up, rather than down as in a static configuration case. MTD data protection rely on mechanisms such as dynamically moving real data on disks or storage appliances to make them harder to identify and attack. This principle is also applied to moving target application security and moving target network security.

Data mobility is key for MTD systems. Certain virtual machine (VM) system products have been developed to allow live migration of virtual machines from one server to another, such as VMWare's VMotion. However, such methods have not been applied to current container-based systems. Moreover, they do not adequately implement live migration of the storage systems. Other snapshot-based methods, such as check pointing the states of containers may facilitate live migration of containers, however such methods do not adequately scale to large workloads.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. VMotion is a trademark of VMware Corp.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
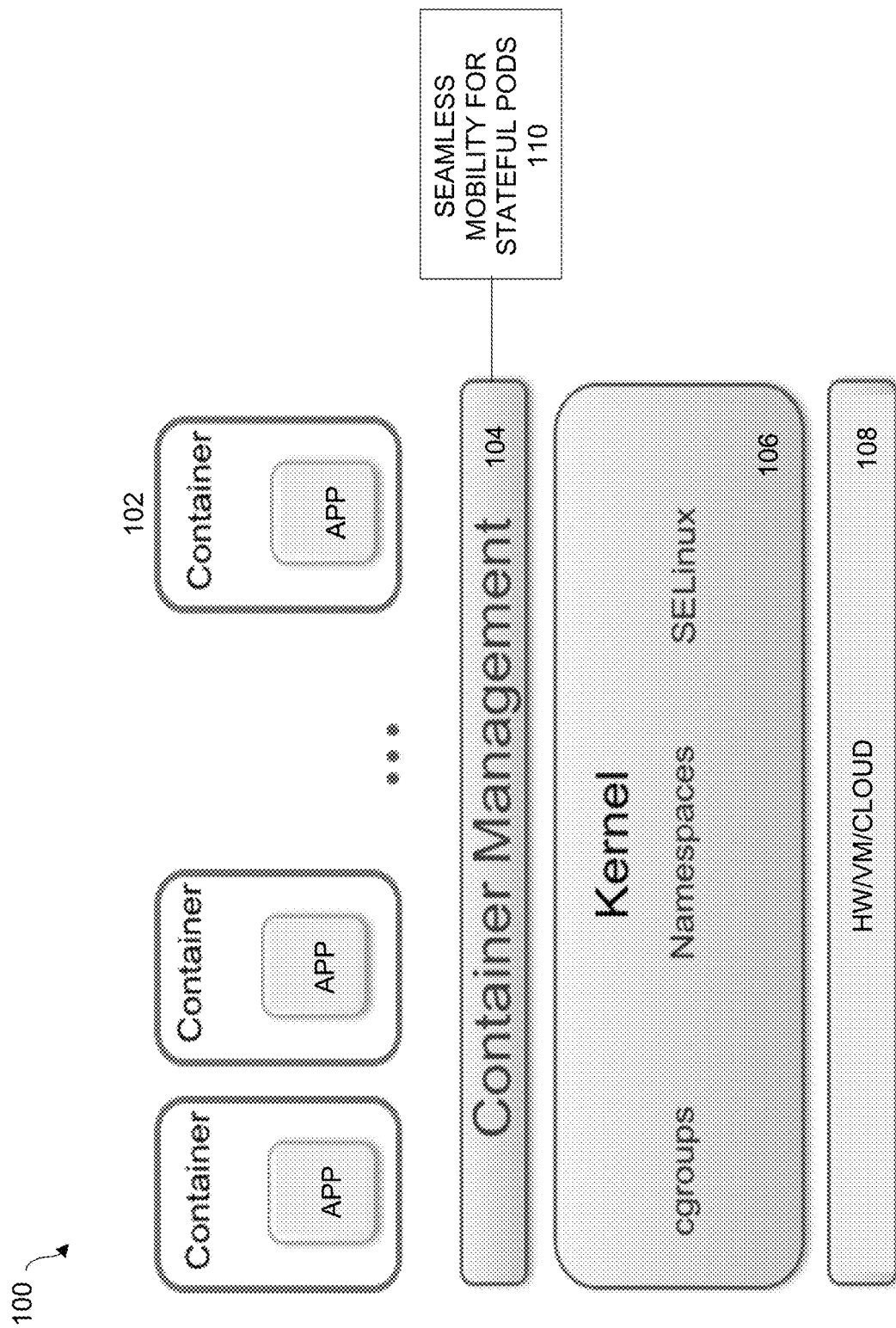
FIG. 1 is a diagram of a container management system implementing NBD based continuous replication, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments provide a seamless mobility process for stateful containers or virtual machines by combining Resource Management System and Moving Target Defense systems to allow live migration of running machines and their associated storage, and the live migration large workloads and/or high numbers of containers or virtual machines.

In an embodiment, the container management system comprises a Kubernetes system, though all embodiments are not so limited. Other container management systems similar to Kubernetes may also be used, and specific reference to Kubernetes is meant to be primarily for example or illustration.

FIG. 1 illustrates a container management system that includes or executes an MTD system for containerized applications. As shown in FIG. 1, system 100, a number of applications (apps) are encapsulated in respective containers 102 so that each application operates within its own operating environment. The containers are deployed as portable, self-sufficient data structures that can run any practical hardware platform 108 from VMs, cloud clusters, servers, and so on. The multiple isolated containers are run on a single control host and access a single kernel 106 that provides access to certain Linux kernel features such as cgroups (control groups), namespaces, security enhancements (e.g., SELinux), and so on. In an embodiment, system 100 utilizes the Docker container format to abstract the lower layer of container technology, though other similar formats may also be used.

The container management layer 104 is used to automate the creation, destruction, deployment and scaling of the containers 102. It includes a container orchestration process or component that arranges, coordinates and manages the containers. As the number and scale of the containers increases, certain orchestration tasks are required, such as service discovery, load balancing configuration, health checks, auto-scaling, zero-downtime deploys, and so on. Replication of container data is also key for critical enterprise tasks such as disaster recovery and data restoration. For the embodiment of FIG. 1, an MTD/RMS-based seamless mobility process 110 for stateful pods is used in conjunction with the container management layer 104, as described in greater detail later in this description.

Kubernetes Container Management Platform

In an embodiment, the container management layer is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster is the foundation the system and the Kubernetes objects that represent the containerized applications all run on top of a cluster.

Figure 2:
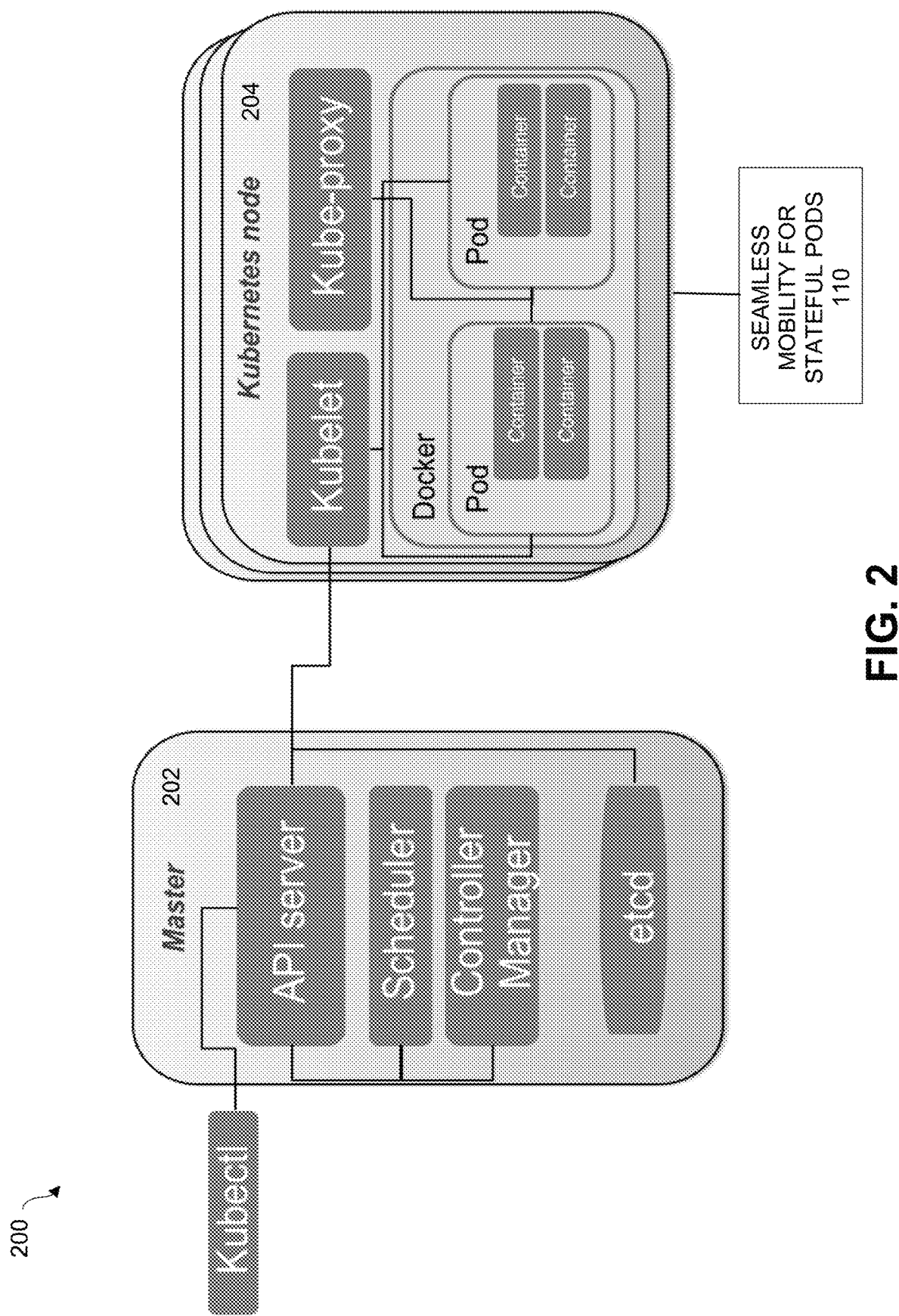
FIG. 2 is a block diagram that illustrates the architecture of a Kubernetes platform, under some embodiments.

FIG. 2 is a block diagram 200 that illustrates the architecture of a Kubernetes platform, under some embodiments. The controlling services in a Kubernetes cluster are called the master 202, or control plane, components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system. Below, we will cover these components.

One of the fundamental components that Kubernetes needs to function is a globally available configuration store. The etcd project, developed by the CoreOS team, is a lightweight, distributed key-value store that can be distributed across multiple nodes. Kubernetes uses etcd to store configuration data that can be used by each of the nodes in the cluster. This can be used for service discovery and represents the state of the cluster that each component can reference to configure or reconfigure themselves. By providing a simple HTTP/JSON API, the interface for setting or retrieving values is very straight forward. Like most other components in the control plane, etcd can be configured on a single master server or, in production scenarios, distributed among a number of machines. The only requirement is that it be network accessible to each of the Kubernetes machines.

One of the most important master services is an API server. This is the main management point of the entire cluster, as it allows a user to configure many of Kubernetes' workloads and organizational units. It also is responsible for making sure that the etcd store and the service details of deployed containers are in agreement. It acts as the bridge between various components to maintain cluster health and disseminate information and commands. The API server implements a RESTful interface, which means that many different tools and libraries can readily communicate with it. A client called kubecfg is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to e t c d, where the controller manager watches for changes through the API server. When a change is seen, the controller reads the new information and implements the procedure that fulfills the desired state. This can involve scaling an application up or down, adjusting endpoints, etc.

The process that actually assigns workloads to specific nodes in the cluster is the scheduler. This is used to read in a service's operating requirements, analyze the current infrastructure environment, and place the work on an acceptable node or nodes. The scheduler is responsible for tracking resource utilization on each host to make sure that workloads are not scheduled in excess of the available resources. The scheduler must know the total resources available on each server, as well as the resources allocated to existing workloads assigned on each server.

In Kubernetes, servers that perform work are known as nodes 204. Node servers have a few requirements that are necessary to communicate with the master components, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed. One key assumption that Kubernetes makes is that a dedicated subnet is available to each node server. This is not the case with many standard clustered deployments. For instance, with CoreOS, a separate networking fabric called flannel is needed for this purpose. Docker must be configured to use this so that it can expose ports in the correct fashion. In an embodiment, the seamless mobility process 110 is executed in each node or at least some nodes 204 of the system 200.

The main contact point for each node with the cluster group is through a small service called kubelet. This service is responsible for relaying information to and from the control plane services, as well as interacting with the etcd store to read configuration details or write new values. The kubelet service communicates with the master components to receive commands and work. Work is received in the form of a "manifest" which defines the workload and the operating parameters. The kubelet process then assumes responsibility for maintaining the state of the work on the node server.

In order to deal with individual host subnetting and in order to make services available to external parties, a small proxy service is run on each node server. This process forwards requests to the correct containers, can do primitive load balancing, and is generally responsible for making sure the networking environment is predictable and accessible, but isolated.

While containers are the used to deploy applications, the workloads that define each type of work are specific to Kubernetes. Different types of "work" that can be assigned, as described below. A pod is the basic unit that Kubernetes deals with. Containers themselves are not assigned to hosts. Instead, closely related containers are grouped together in a pod. A pod generally represents one or more containers that should be controlled as a single "application." This association leads all of the involved containers to be scheduled on the same host. They are managed as a unit and they share an environment. This means that they can share volumes and IP space, and can be deployed and scaled as a single application. Pods can be thought of as a single virtual computer in order to best conceptualize how the resources and scheduling should work. The general design of pods usually consists of the main container that satisfies the general purpose of the pod, and optionally some helper containers that facilitate related tasks. These are programs that benefit from being run and managed in their own container, but are heavily tied to the main application. Horizontal scaling is generally discouraged on the pod level because there are other units more suited for the task.

A pod is thus the basic building block of Kubernetes and comprises one or more containers and share storage resources, and network resources. Pods run in a shared context, share the same IP using different port for containers. Containers within a pod can communicate using inter process communication. In general though, pods are not durable entities and will not survive failures. Pods generally reside on nodes, and more than one pod can share the same node. The containers within each pod share common networking and storage resources from that host node, as well as specifications that determine how the containers run.

Within the context of Kubernetes, the term "service" may be used to have a very specific definition when describing work units. A service, when described this way, is a unit that acts as a basic load balancer and ambassador for other containers. A service groups together logical collections of pods that perform the same function to present them as a single entity. This allows a user to deploy a service unit that is aware of all of the backend containers to pass traffic to. External applications only need to worry about a single access point, but benefit from a scalable backend or at least a backend that can be swapped out when necessary. A service's IP address remains stable, abstracting any changes to the pod IP addresses that can happen as nodes die or pods are rescheduled. Services are an interface to a group of containers so that consumers do not have to worry about anything beyond a single access location. Deploying a service allows a user to easily gain discoverability and can simplify container designs.

A Kubernetes organizational concept outside of the work-based units is labeling. A label is basically an arbitrary tag that can be placed on the above work units to mark them as a part of a group. These can then be selected for management purposes and action targeting. Labels are fundamental to the function of both services and replication controllers. To get a list of backend servers that a service should pass traffic to, it usually selects containers based on label. Labels are given as key-value pairs. Each unit can have more than one label, but each unit can only have one entry for each key. Pods can be given a "name" key as a general purpose identifier, or they can be classified them by various criteria such as development stage, public accessibility, application version, etc. In many cases, many labels can be assigned for fine-grained control. A user can then select based on a single or combined label requirements.

With respect to data replication, a more complex version of a pod known as a replicated pod may be used. These are handled by a type of work unit known as a replication controller. A replication controller is a framework for defining pods that are meant to be horizontally scaled. The work unit is, in essence, a nested unit. A template is provided, which is basically a complete pod definition. This is wrapped with additional details about the replication work that should be done. The replication controller is delegated responsibility over maintaining a desired number of copies. This means that if a container temporarily goes down, the replication controller might start up another container. If the first container comes back online, the controller will kill off one of the containers. Replication controllers are generally responsible for watching objects state and trying to bring it to the desired state, and work with a ReplicaSet and Deployment objects. A ReplicaSet owns and manages pods and ensures that a specified number of pod "replicas" are running at any given time. A ReplicaSet can be auto-scaled by an Horizontal Pod Autoscalers (HPA). It is mainly used by Deployments as a mechanism to orchestrate pods. A Deployment owns and manages ReplicaSets, provides declarative updates for Pods and ReplicaSets, supports rolling updates, and supports rollbacks.

Kubernetes makes a distinction between an application that is 'stateless' or that the application is 'stateful' based on an application's underlying architecture. A stateless application does not require or depend on persistent storage. The cluster is responsible only for the code, and other static content being hosted on it. In contrast, a stateful application has several other parameters to maintain in the cluster, e.g., changing databases, left over writes or files when a pod is deleted, and so on. A common stateful application are dynamic databases that persist on the disk even when the app is offline or deleted. In Kubernetes, StatefulSets are intended to be used with stateful applications and distributed systems. Pods in a StatefulSet have a unique ordinal index and a stable ("sticky") network identity. This identity is based on a unique ordinal index that is assigned to each pod by a StatefulSet controller. The pods' names take the form: <statefulset name>-<ordinal index>. Since the web StatefulSet has two replicas, it creates two Pods: web-0 and web-1. Each pod thus has a stable hostname based on its ordinal index.

Persistent Volumes

With respect to Kubernetes storage, on-disk files in a container are ephemeral. To provide data persistency, Kubernetes uses the "Volume" Concept, where a volume is a directory that is mounted to the container at a specific path. The lifetime and other characteristic depends on the storage type backing it. To become a storage provider one needs to implement a "volume plugin" (Kubernetes volume API). The volume is persistent between container failovers but may or may not be erased after a pod removal. It also enables file sharing between containers. Any practical storage type may be used including: emptyDir, hostPath, gcePersistentDisk, awsElasticBlockStore, NFS, iSCSI, Fibre Channel, flocker, glusterfs, RBD, cephfs, gitRepo, secret, persistentVolumeClaim, downwardAPI, projected, azureFileVolume, azureDisk, vsphereVolume, Quobyte, PortworxVolume, ScaleIO, StorageOS, and local storage.

In general, managing storage can be a distinct problem. The PersistentVolume subsystem provides an API for users and administrators that abstracts details of how storage is provided from how it is consumed. In an embodiment two new API resources are provided: PersistentVolume and PersistentVolumeClaim.

A PersistentVolume (PV) is a piece of storage in the cluster that has been provisioned by an administrator. It is a resource in the cluster just like a node is a cluster resource. PVs are volume plugins like volumes, but have a lifecycle independent of any individual pod that uses the PV. This API object captures the details of the implementation of the storage, be that NFS, iSCSI, or a cloud-provider-specific storage system.

A PersistentVolumeClaim (PVC) is a request for storage by a user. It is similar to a pod. Pods consume node resources and PVCs consume PV resources. Pods can request specific levels of resources (CPU and Memory). Claims can request specific size and access modes (e.g., can be mounted once read/write or many times read-only). While PersistentVolumeClaims allow a user to consume abstract storage resources, it is common that users need PersistentVolumes with varying properties, such as performance, for different problems. Cluster administrators need to be able to offer a variety of PersistentVolumes that differ in more ways than just size and access modes, without exposing users to the details of how those volumes are implemented. For these needs there is the StorageClass resource.

PersistentVolumes (PV) thus abstracts the storage management. With PersistentVolume, storage is provisioned by the admin with independent lifecycle of any pod. A PersistentVolumeClaim (PVC) is a request for storage by a user, PVC consumes PV, and can request specific size and access modes. A StorageClass acts as a profile/description of the storage determined by the administrator to be dynamically consumed Provisioning of storage can be static or dynamic. In the static case, the admin allocated a storage and created a specific PV with the details to be consumed. In the dynamic case, if none of the static PV matches the claim the cluster can allocate a storage dynamically according to the user defined storage class.

With respect to binding, a bound condition is when the controller finds a PV to match the PVC the PV is bound to the PVC exclusively. In an unbound condition, if no match was found the PVC will stay unbound until a matched PV be added to the cluster. The user uses the PVC as a volume, and the cluster will search for the bounded PV and mount it to the pod. The volume considered released only when the PVC has been deleted. For reclaiming, the system can define a policy for PV reusing once released. A retain process allows for manual reclamation of the resource, and a delete process deletes the PV and the actual storage allocated for it. For recycling, in most cases the volume content will be deleted (rm–rf/volume/*) but can be replaced by a custom recycler.

Resource Management System (RMS)

The Resource Management System or Resource Mapping System (RMS) was developed as part of a Platform-as-a-Service (PAAS) solution for Kubernetes that continually kills and creates containers from clean "golden" images.

Figure 3:
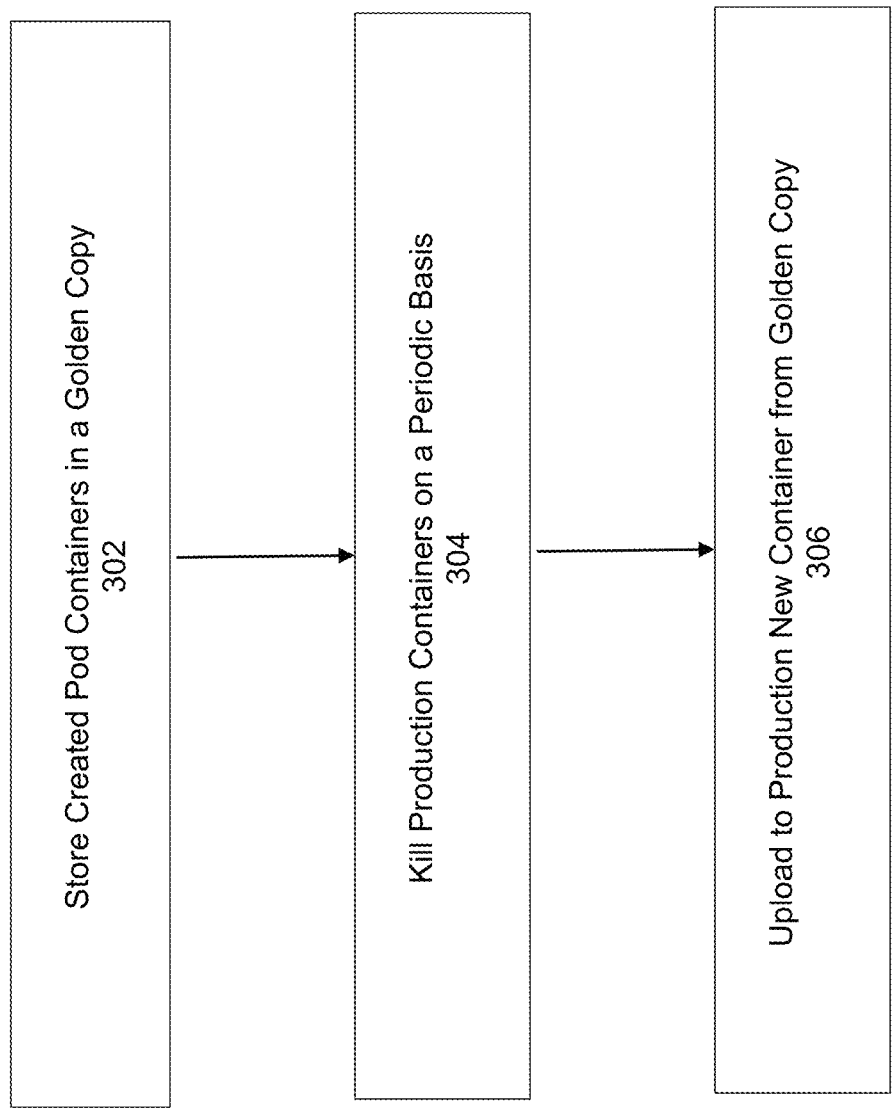
FIG. 3 is a flowchart that illustrates a resource management process used in a Kubernetes container management system, under some embodiments.

FIG. 3 is a flowchart that illustrates the overall steps of a resource management process used in a Kubernetes container management system, under some embodiments. In an initial step, the process stores the code for the created pod containers in a secure location as a "golden copy," 302. During deployment and use, the RMS process kills the production containers on a periodic basis, where the period of time can be random or pre-defined by the user or system, such as on the order of every day, hour, week, etc., 304. After a production container or containers is killed, the process uploads to production a new container from the golden copy instead of the container that was killed, 306.

Figure 4:
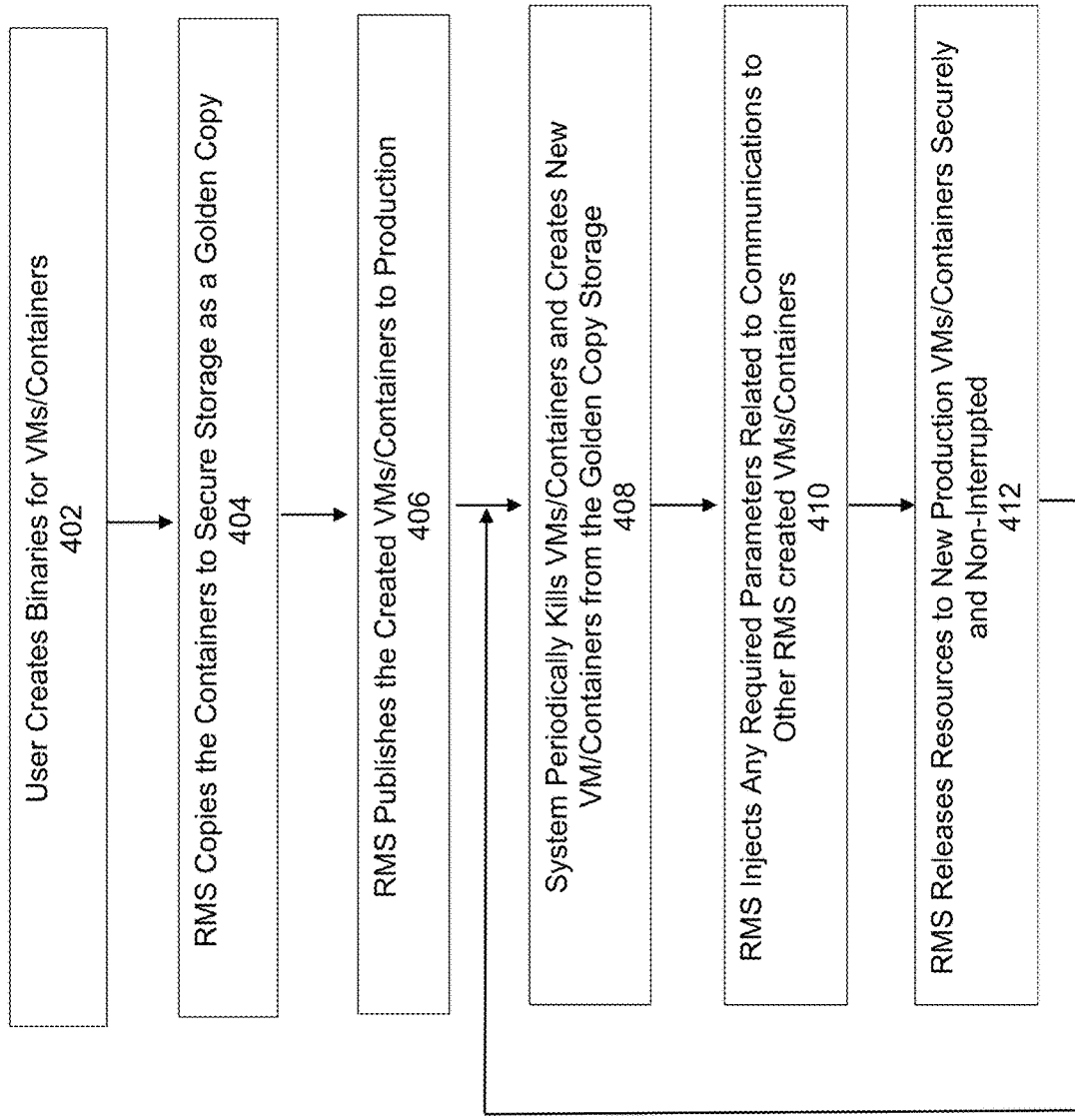
FIG. 4 is a flowchart that illustrates a deployment lifecycle for containers in an RMS system, under some embodiments.

The deployment lifecycle for containers in an RMS system would then be dictated by the periodic killing and re-copying of golden copy containers, as illustrated in the flowchart of FIG. 4. As shown in FIG. 4, the deployment process begins with the user creating the binaries for the virtual machines or containers, 402. The RMS process then copies the containers to a safe storage location that is defined as the golden copy, 404. The RMS process then publishes the created VMs/containers to production, 406. During deployment and use, the system periodically kills the production VMs/containers and creates new VMs/containers from the golden storage, 408. The RMS process injects any required parameters related to communication to other VMs/containers also created by the RMS process to the newly created VMs/containers, 410. The RMS process then releases resources to the new production VMs/containers in a secure way with no minimal or no interruption to the related application performance, 412. On the defined period, the process of FIG. 4 repeats steps 408 to 410 during the deployment lifetime of the VMs/containers.

The RMS process thus ensures that a non-corrupted "golden" copy of a container or virtual machine is used to create new production version in case of any system attack.

Moving Target Defense

In an embodiment, the RMS process is used with a Moving Target Defense (MTD) procedure to create a constantly shifting container environment to defend against system attacks. As described previously, MTD is a system that periodically changes the IP addresses, names, MAC addresses, or other identifiers of containers in order to make it much harder (compared to a static system) to map the network topology, such as during the attack step of reconnaissance and scanning. It allows gives the user the ability to learn the machine behavior for cycles of use, where a cycle is the time period before the change to a new IP address, and by doing so recognize abnormal behavior. The MTD process is used to load the golden container image meaning when the system replaces the IP address for a container, the newly loaded container will be from a golden image. This prevents the possibility of loading a malicious file.

MTD was generally developed to improve security, but it has the ability to cause a restart of all containers, and change their IP address or other locator/identifiers. MTD also supports stateful containers by first draining all the I/O operations of the containers before restarting them.

Kubernetes and Docker also support checkpoint restore in user space (CRIU). CRIU provides support for check pointing the complete state of a container, including memory, much like a VM snapshot saves the entire state of a virtual machine. Unlike a VM snapshot, however, a CRIU checkpoint can be significantly faster (and smaller). CRIU is a general Linux application snapshot facility, but other checkpoint restore mechanisms can also be used under alternative embodiments. Systems like CRIU, however, are not very scalable. That is, they work for individual machines or small groups of machines, but not very well for deployments on the order of hundreds or thousands of machines, since the movement of large workloads by taking and moving snapshots can take a large period of time.

Seamless Mobility for Stateful Pods

Embodiments of the seamless mobility process for stateful pods combines the RMS and MTD systems to allow live running pods and associated storage, and the live migrate large workloads and scale to high numbers of containers or virtual machines. This process provides the ability to periodically move live stateful pods to run in a different site. As applications based on containers are designed to survive restart of the container, the process can leverage architectures like MTD to do relatively simple live migration of applications. Embodiments include methods and systems for leveraging the MTD system, which allows seamless restart and IP changes of the containers in order to provide long distance mobility.

In an alternative embodiment, RMS is can be considered the base system that periodically creates new containers from a secure golden copy, and MTD essentially runs on top of RMS to periodically change the IP addresses, names, MAC addresses, etc. of the new containers. The periodicity of both the RMS and MTD processes can be set by configuration parameters in the orchestration layer of the container management component 104. The respective periods can be set to the same value so that MTD changes the addresses/IDs of the new containers as they are created, or they can be set to different values so that, for example, new containers are changed more frequently than the rate that they are changed.

In an embodiment, the seamless mobility process 110 can be used as part of an overall container management process that may utilize a number of different pod migration strategies. In general, the replication site concept is new to MTD for the described embodiments that combine MTD with data mobility. The MTD process in these embodiments is not necessarily being used to change any IP or security aspects of a system, but rather is leveraged to re-run a live application to move the application.

Figure 5:
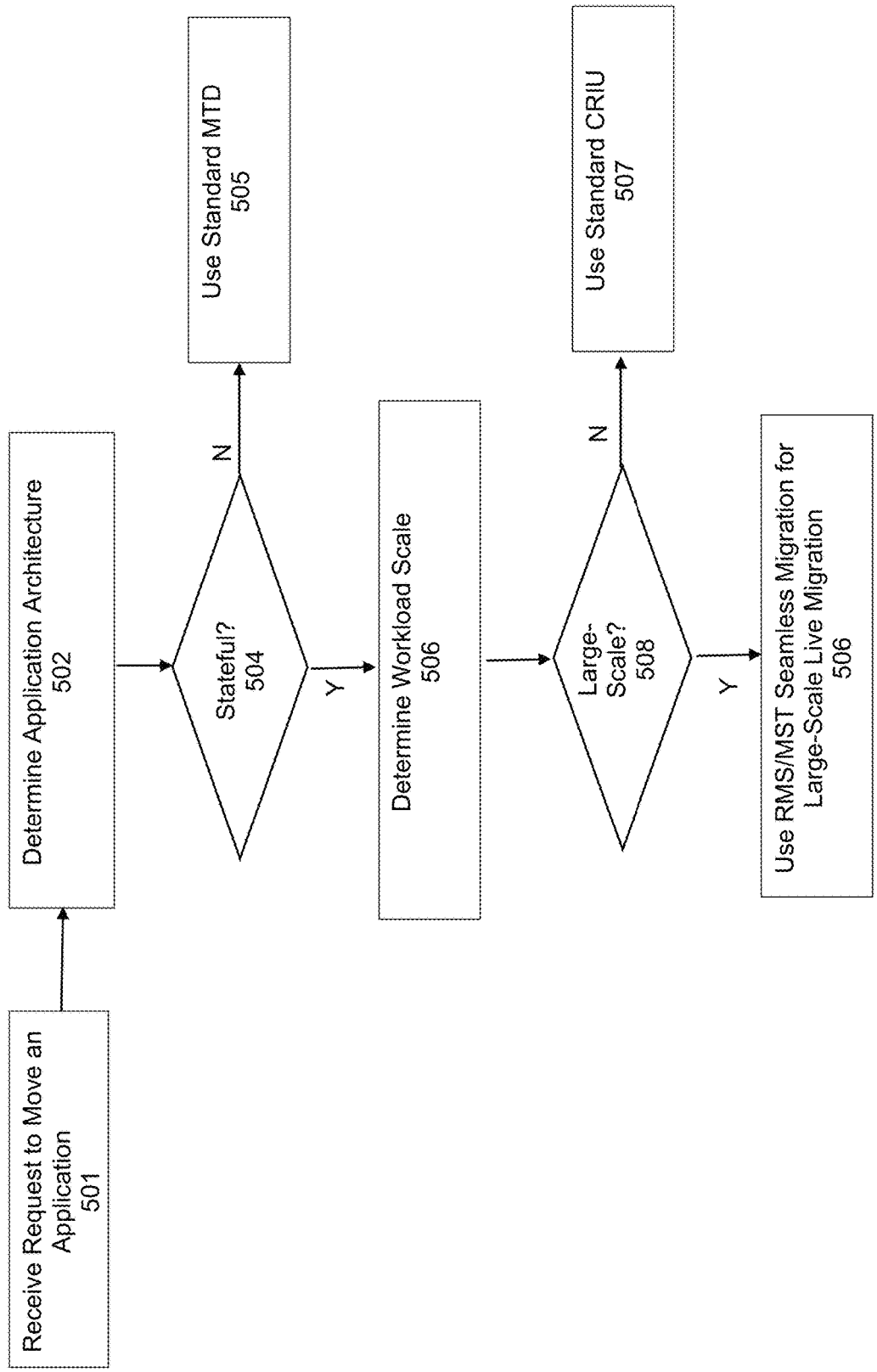
FIG. 5 is a flowchart that illustrates the use of RMS/MST based seamless migration in the context of alternative migration strategies, under some embodiments.

FIG. 5 is a flowchart that illustrates the use of RMS/MST based seamless migration in the context of alternative migration strategies, under some embodiments. In general, the seamless migration process is most useful and suitable for large numbers of stateful pods. In step 501, the process receives a request to move an application. In step 502 of FIG. 5, the architecture of the applications is determined with respect to statefulness. If the applications are stateless (non-persistent), standard MTD can be used to protect or reconfigure the containers, 505. If the applications are stateful, the process next determines the scale of the workload in decision block 508. If the workload is on the order of single or tens of VMs or containers, a standard snapshot-based method, such as CRIU can be used to migrate the containers, 507. If the workload is large-scale, the RMS/MST seamless migration process 110 is used to live migrate large numbers of containers, 506.

For the method of FIG. 5, small containers or ones where I/Os cannot be flushed use CRIU, stateless applications uses standard MTD, which can just run them in another location, and the rest will use replication with MTD techniques for failover.

Figure 6:
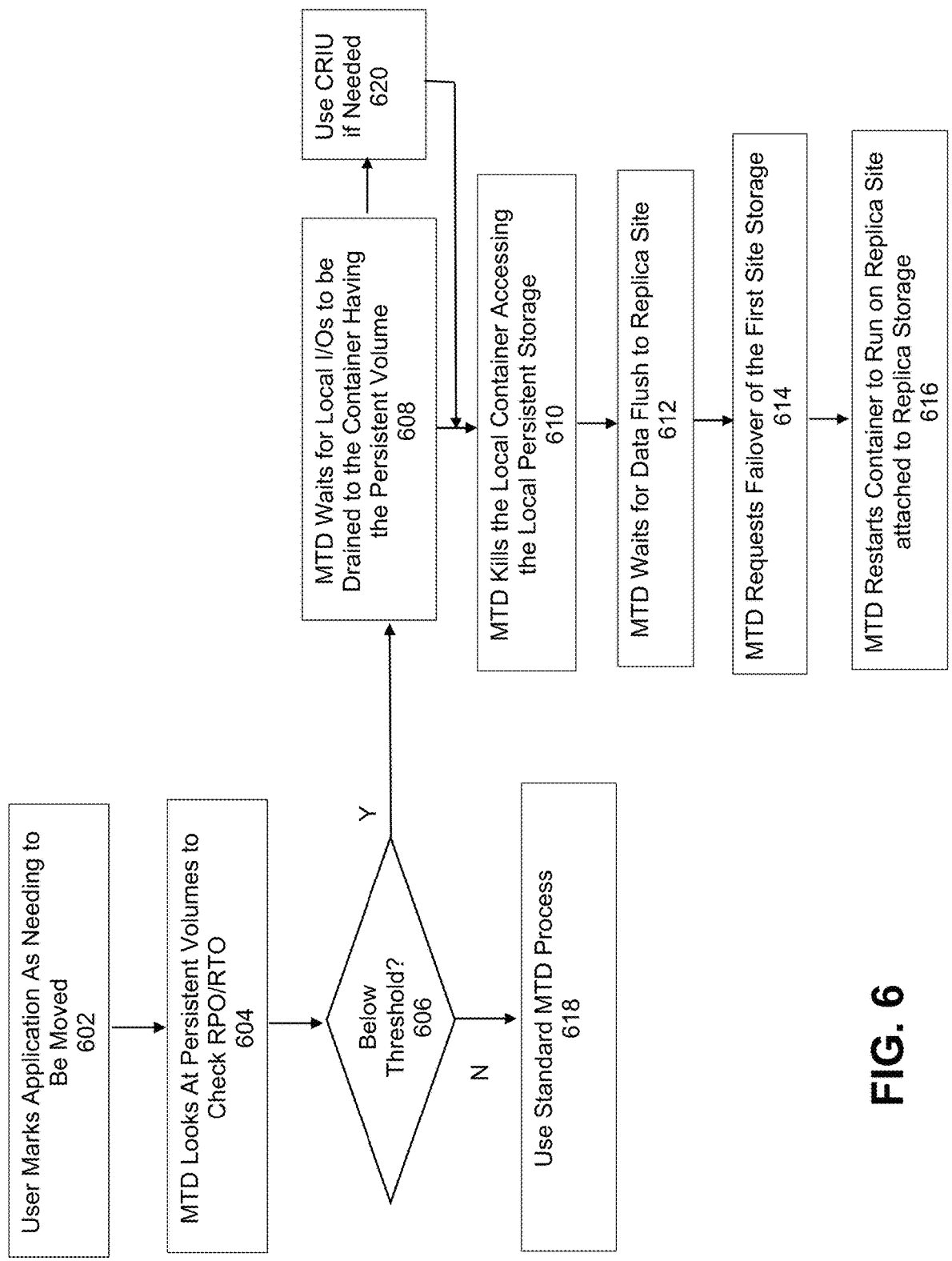
FIG. 6 is a flowchart that illustrates a method of performing container migration using the seamless MTD/RMS process 110, under some embodiments.

FIG. 6 is a flowchart that illustrates a method of performing container migration using the seamless MTD/RMS process 110, under some embodiments. The process of FIG. 6 starts with the user, or other automated process, marking that an application or pod needs to be moved to another location, 602. Such an indication is typically made in a user interface (UI) component or API (application programming interface) of the MTD process. The MTD system will look at all persistent volumes which are attached to the pod, 604. For each persistent volume, replication will be configured to transfer data from the source volume to a remote volume. The failover process will be configured to occur when a sufficiently low RPO/RTO threshold is reached, where the Recovery Point Objective (RPO) or the Recovery Time Objective (RTO) is typically on the order of seconds. If in step 606 it is determined that the RPO/RTO is below the defined threshold, the MTD process will start killing the container using the persistent volumes. For this sub-process, the MTD will first wait for the local I/Os to be drained to the container having the persistent volume attached, 608, and will then kill the local container accessing the local persistent storage, 610 (which can be done using existing functionality of the MTD process). The MTD process will then wait for data to be flushed to the replica site, 612. After this, the MTD process asks for a failover of the storage, 614. Waiting for data to flush generally entails waiting for all I/Os which started to arrive at the replica storage for this remote replication process. The MTD will then restart the container/pod to run on the replica site attached to the replica storage, 616. The use of replica storage 616 and first site storage 614 illustrates the live migration of storage within the container system using the MTD/RMS process.

As shown in FIG. 6, for non-persistent containers or if the RPO/RTO threshold is not met, the standard MTD mechanism can be used for changing the container IDs and addresses, 618.

For the process of FIG. 6, if the container has a problem draining the I/Os in step 608, the process can leverage the CRIU process to create a copy of the container memory, 620. For this sub-process 620, the MTD process will send the memory copy to the replica site and start running it on the replica site. The storage addresses will need to be the same, but storage virtualization can solve this problem. In general, CRIU is used as a last resort because moving the memory can be time consuming and even impossible for large application. The system will thus try to use the MTD I/O draining method for most workloads. It is assumed here that the remote site is part of the same Kubernetes cluster. If it instead belongs to a different cluster, the configuration and portion of etcd will also need to be replicated to the remote Kubernetes cluster.

The MTD process of FIG. 6 periodically changes at least one of the IP address, name, and MAC address of the container prior to moving the container/pod to the replica site. It uses the RMS method utilizing the secure golden copy storage location created by the RMS process. Namely, it uses the address of the golden copy storage location as a container location on the replica site.

Figure 7:
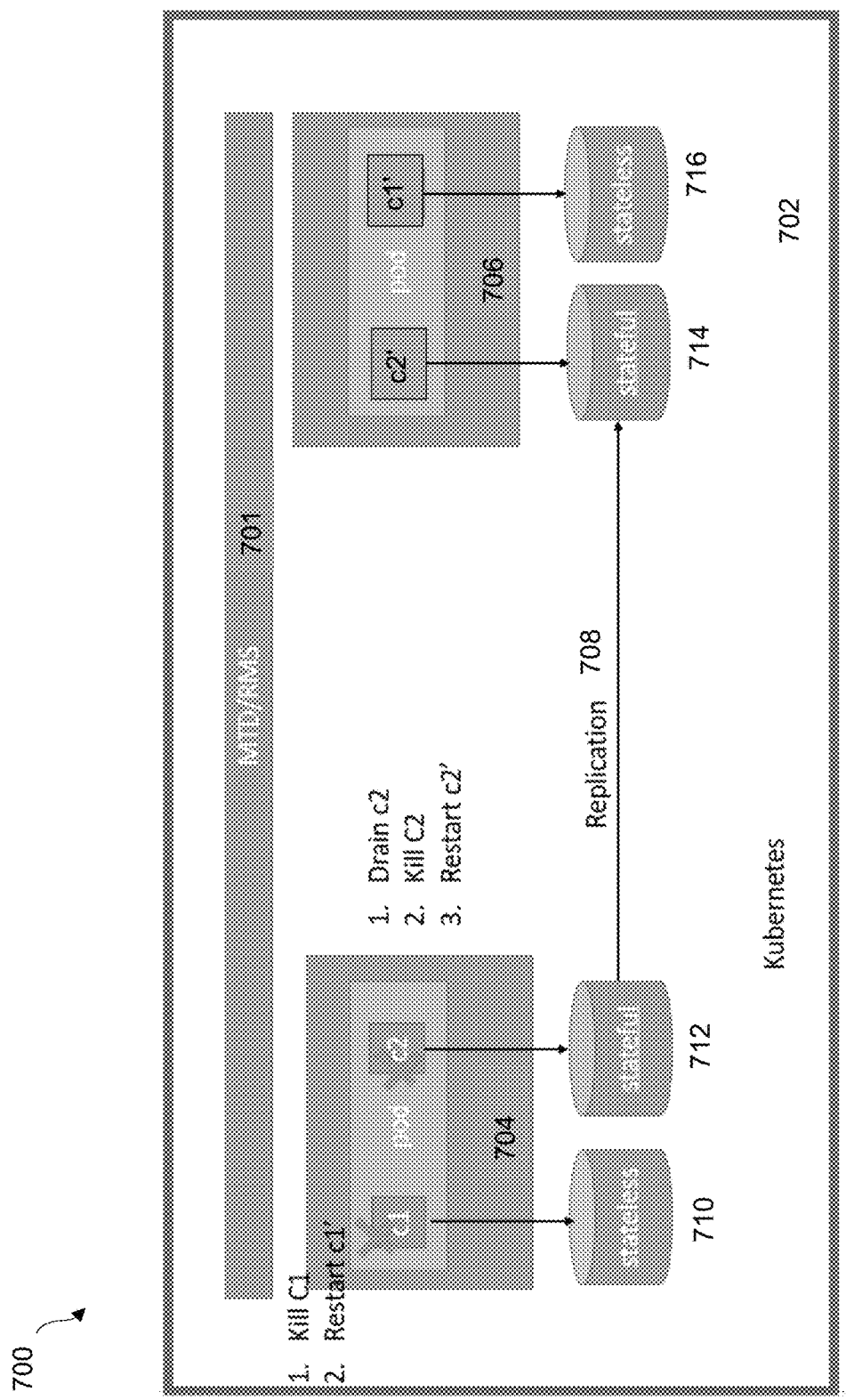
FIG. 7 illustrates an example movement of pods using the MTD/RMS process, under some embodiments.

FIG. 7 illustrates an example movement of pods using the MTD/RMS process 701, under some embodiments. As shown in diagram 700, a Kubernetes system 702 has two sites 704 and 706, in which site 706 is a replica site. Site 704 has a pod with two containers C1 with a stateless ephemeral volume 710 attached to it, and C2 with a stateful volume 712 attached to it. To move the pod to run on remote site, the MTD process configures replication process 708 for the stateful volume, once RTO/RPO are below a defined threshold. Container C2 of the pod in site 704 will stop accepting network traffic, the system will wait for IOs to drain, then C2 will be killed and restarted as C2' on the replica site 706 attached to the replica volume copy. As container C1 is stateless, it can be killed and restarted as C1' without waiting for I/Os to drain. In this manner, the containers 710 and 712 are replicated to generate stateful container 714 and stateless container 716, respectively. Thus, in the stateless case, the MTD/RMS process 701 simply kills container C1 on the first site and restarts container C1' on the replica site; and for the stateful case it first drains container C2 on the first site, then kills C2 on the first site, and restarts container C2' on the replica site. The stateful container kill case (C2) includes a step that waits for the data to be flushed to the replica site using the MTD process, as shown in step 612 of FIG. 6.

Embodiments of the seamless migration process 110 for stateful pods can be used to implement efficient and effective backups using the replication controller. Replication is the core of the data protection and disaster recovery practices for enterprises. Data protection (DP) enables recovery of data on the production site from an operational error, copies are from multiple points in time. The replica copy can be on the same site for this purpose. Disaster recovery (DR) provides a full data recovery solution for a cases where there is a full production site disaster. For this reason a DR must have a replica copy on a remote site. The copy can be latest point in time but DR may also support operational recovery from multiple point in time. Using the shifting network methods of MTD protects the replicated data from corruption or malicious attacks.

Figure 8:
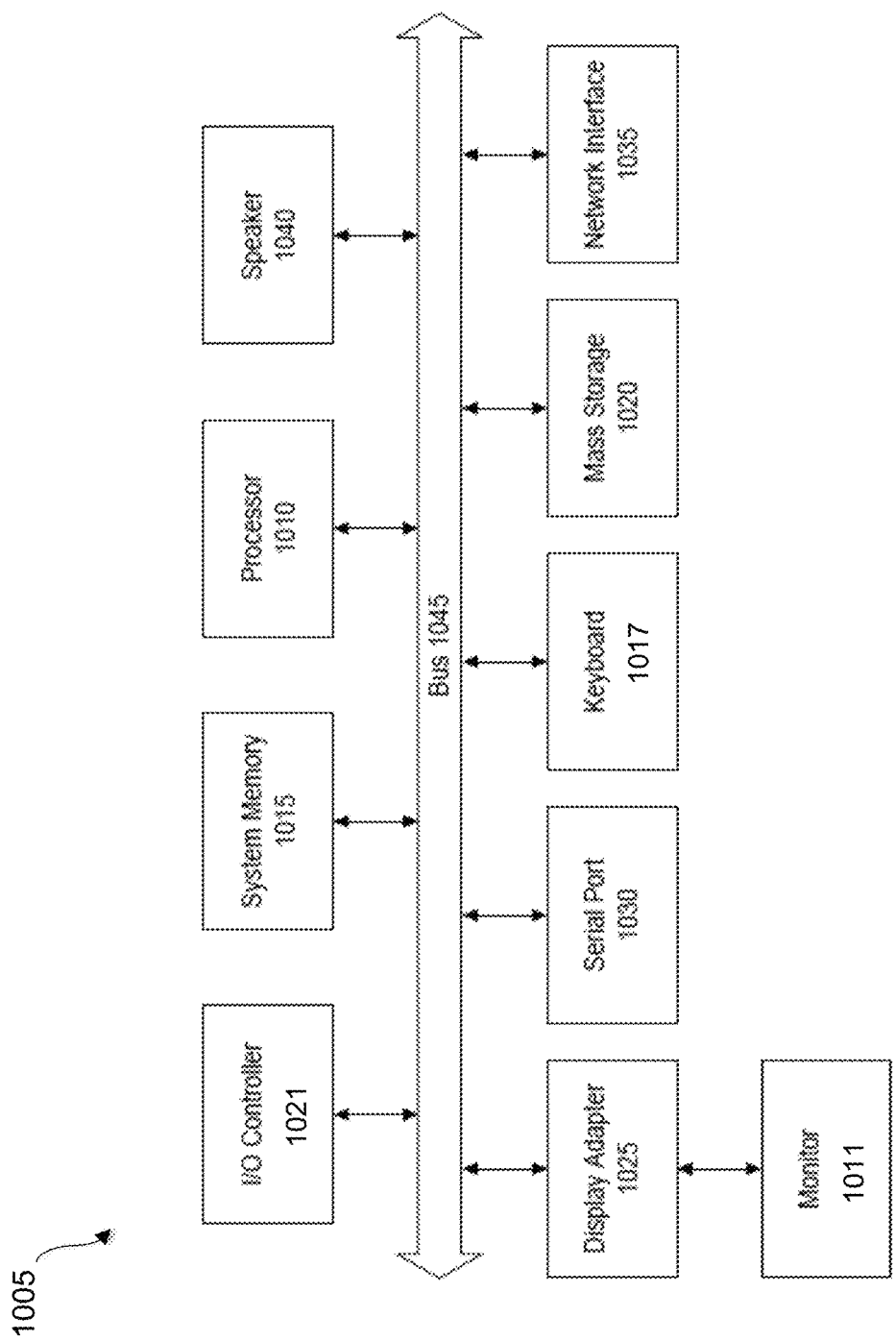
FIG. 8 shows a system block diagram of a computer system used to execute one or more software components of the present system described herein.

The network of FIG. 1 may comprise any number of individual client-server networks including virtual machines coupled over the Internet or similar large-scale network or portion thereof. Each processing device in the network or container system may comprise a computing device capable of executing software code to perform the processing steps described herein. FIG. 8 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 8 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing seamless mobility of stateful pods in a container management system, comprising:
    receiving an indication that a pod requires a movement from a first site to a second site;
    identifying, through a moving target defense (MTD) process, all persistent volumes attached to the pod;
    determining if a time objective for the movement is below a threshold value of a recovery point objective or recovery time objective;
    draining all local I/O operations to a container having the persistent volumes attached;
    killing, by the MTD process if the time objective is below the threshold, containers of the pod using the persistent volumes after the draining step;
    waiting, by the MTD process, for data to be flushed to the second site;
    initiating a failover of a first storage of the first site; and
    restarting, by the MTD process, a container to run on the second site attached to a second storage.

2. The method of claim 1 wherein the pod comprises a basic unit of the container management system and comprising a plurality of closely related containers grouped together to be controlled as a single application.

3. The method of claim 2 wherein the container management system comprises a Kubernetes system, and wherein each persistent volume is implemented as a Kubernetes PersistentVolume (PV) in a cluster.

4. The method of claim 1 wherein the second site comprises a replica site, the second storage comprises a replica storage, and the movement from the first site to the replica site comprises a replication operation.

5. The method of claim 4 wherein the time objective comprises at least one of a recovery point objective and a recovery time objective of the replication operation.

6. The method of claim 1 further comprising invoking a checkpoint restore in user space (CRIU) operation if the draining step does not complete within a defined period of time.

7. The method of claim 6 wherein the CRIU operation comprises:
    creating a snapshot copy of a container memory;
    sending the snapshot copy to memory of the second site; and
    using virtualization methods to ensure that respective storage addresses between the container memory and the memory of the second site remain unchanged.

8. The method of claim 1 wherein the MTD process periodically changes at least one of IP address, name, and MAC address of the container having the persistent volumes prior to moving the pod to the second site.

9. The method of claim 1 wherein the MTD process uses a resource management system (RMS) process to create a secure golden copy storage location to store the container having the persistent volumes.

10. The method of claim 9 wherein the MTD process using an address of the golden copy storage location as a container location on the second site.

11. A computer-implemented method of providing seamless mobility of stateful pods in a container management system, comprising:
defining, through a resource management system (RMS) process an address of a golden copy of a container created on a first periodic basis for the container;
changing, through a moving target defense (MTD) process an address of the container on a second periodic basis;
killing the container, upon indication of a desire move of the container and through the MTD process;
waiting, by the MTD process, I/O operations to be drained by a draining process to the container and flushed to a replica site; and
using the address of the golden copy assigned by the RMS process as an address of the replica site.

12. The method of claim 11 further comprising:
requesting, by the MTD process, failover of first storage attached to the container; and
restarting, by the MTD process, a new container to run on replica storage attached to the replica site.

13. The method of claim 12 wherein the container comprises a stateful container having at least one of: one or more stateful applications with parameters to maintain in the container management system, or a sticky network identity.

14. The method of claim 13 wherein the container comprises part of a pod within the container management system, and wherein the pod comprises a plurality of closely related containers grouped together to be controlled as a single application.

15. The method of claim 14 wherein the container management system comprises a Kubernetes system, and wherein a persistent volume is implemented as a Kubernetes PersistentVolume (PV) in a cluster.

16. The method of claim 11 further comprising invoking a checkpoint restore in user space (CRIU) operation if the draining process does not complete within a defined period of time.

17. The method of claim 16 wherein the CRIU operation comprises: creating a snapshot copy of a container memory; sending the snapshot copy to the replica storage; and using virtualization methods to ensure that respective storage addresses between the container memory and the memory of the second site remain unchanged.

18. The method of claim 11 wherein the first periodic basis is one of: the same, longer, or shorter than the second periodic basis.

19. A system for providing seamless mobility of stateful pods in a container management system, comprising:
an interface receiving an indication that a pod requires a movement from a first site to a replica site; and
a hardware processor functionally coupled to the interface and having a moving target defense (MTD) component identifying all persistent volumes attached to the pod, determining if a time objective for the movement is below a threshold value of a recovery point objective or recovery time objective, draining all local I/O operations to a container having the persistent volumes attached, killing if the time objective is below the threshold, containers of the pod using the persistent volumes after the draining, waiting for data to be flushed to the replica site, initiating a failover of a first storage of the first site, and restarting a container to run on replica storage attached to the replica site.

20. The system of claim 19 further comprising the hardware processor executing a resource management system (RMS) process to create a secure golden copy storage location to store the container having the persistent volumes, wherein the MTD component uses an address of the golden copy storage location as a container location on the replica site.

* * * * *